United States Patent
Kreller et al.

(10) Patent No.: US 6,981,251 B1
(45) Date of Patent: Dec. 27, 2005

(54) AGENT SYSTEM FOR MOBILE AGENTS, COMPUTER NETWORK AND METHOD FOR DOWNLOADING AN AGENT SYSTEM FROM A HOST COMPUTER TO A CLIENT COMPUTER OF A COMPUTER NETWORK

(75) Inventors: Birgit Kreller, Munich (DE); Matthias Reich, Munich (DE); Bjoern Schiemann, Hoehenkirchen-Siegertsbr (DE)

(73) Assignee: Siemens Aktiengesellschaft, Munich (DE)

( * ) Notice: Subject to any disclaimer, the term of this patent is extended or adjusted under 35 U.S.C. 154(b) by 695 days.

(21) Appl. No.: 10/049,864

(22) PCT Filed: Aug. 11, 2000

(86) PCT No.: PCT/DE00/02705

§ 371 (c)(1),
(2), (4) Date: Feb. 19, 2002

(87) PCT Pub. No.: WO01/13224

PCT Pub. Date: Feb. 22, 2001

(30) Foreign Application Priority Data

Aug. 18, 1999 (DE) ................................ 199 39 058

(51) Int. Cl.[7] ............................................ G06F 9/445
(52) U.S. Cl. ...................... 717/171; 719/317; 709/202; 709/203
(58) Field of Search ................................ 719/317, 332; 709/202, 221, 203; 717/168–178, 140–161

(56) References Cited

U.S. PATENT DOCUMENTS

| | | | | |
|---|---|---|---|---|
| 5,603,031 A | | 2/1997 | White et al. | |
| 5,742,829 A | * | 4/1998 | Davis et al. | 717/178 |
| 5,845,090 A | * | 12/1998 | Collins et al. | 709/221 |
| 6,009,274 A | * | 12/1999 | Fletcher et al. | 717/173 |
| 6,175,855 B1 | * | 1/2001 | Reich et al. | 709/202 |
| 6,199,204 B1 | * | 3/2001 | Donohue | 717/178 |
| 6,202,207 B1 | * | 3/2001 | Donohue | 717/173 |
| 6,260,078 B1 | * | 7/2001 | Fowlow | 719/332 |
| 2002/0107945 A1 | * | 8/2002 | George et al. | 709/222 |
| 2002/0120725 A1 | * | 8/2002 | DaCosta et al. | 709/221 |
| 2002/0184619 A1 | * | 12/2002 | Meyerson | 717/173 |
| 2003/0131226 A1 | * | 7/2003 | Spencer et al. | 713/100 |

FOREIGN PATENT DOCUMENTS

EP     0817031 A2     1/1998

OTHER PUBLICATIONS

Wall, David W., "Messages as Active Agents", ACM 0-89791-065-6/82/001/0034, pp. 34-39, 1982.*
Sterns, Glenn R., "Agents and the HP NewWave Application Program Interface" Hewlett-Packard Journal, pp. 32-37, Aug. 1989.*
Reinhardt, Andy, "The Network with Smarts", BYTE, vol. 19, No. 10, pp. 51, 52, 56, 58, 60, 62, 64, Oct. 1994.*

(Continued)

*Primary Examiner*—St. John Courtenay, III
(74) *Attorney, Agent, or Firm*—Staas & Halsey LLP (57) ABSTRACT

An agent system which can be loaded onto a computer in a network is adjusted based on the hardware and/or software of the computer. This makes it possible to incorporate even small mobile computers, in particular simple process computers, into a network in which agent systems are installed on the individual computers, without the power of the agent system needing to be significantly restricted in principle and without needing to dispense with the fundamental applicability of agent systems for small computers.

25 Claims, 3 Drawing Sheets

OTHER PUBLICATIONS

Bradshaw, "Software Agents", Menlo Park, California: AAAI Press/The MIT Press, 1996, Chapter 19, Mobile Agents, pp. 437-472.
Internet: http://www.generalmagic.com/technology/tech-whitepaper.html.

Rößmann, "Applikationen entwickeln unter Windows NT 4.0", Client-Server-Technologie, Design, Programmierung, Addison-Wesley, 1997.
Sep. 3, 1999 Examination Report in corresponding German Patent Application No. 199 39 058.4-53 (with translation).

* cited by examiner

AGENT SYSTEM FOR MOBILE AGENTS, COMPUTER NETWORK AND METHOD FOR DOWNLOADING AN AGENT SYSTEM FROM A HOST COMPUTER TO A CLIENT COMPUTER OF A COMPUTER NETWORK

CROSS REFERENCE TO RELATED APPLICATIONS

This application is based on and hereby claims priority to PCT Application No. PCT/DE00/02705 filed on Aug. 11, 2000, German Patent Application No. 199 39 058.4 filed on Aug. 18, 1999, the contents of which are hereby incorporated by reference.

BACKGROUND OF THE INVENTION

The invention relates to an agent system, in particular an agent system for mobile agents, to a computer network having a plurality of computers networked by data lines and to a method for loading an agent system from a host computer onto a client computer.

Agents are autonomous, cooperative software units comprising code and data. They are independently operating software units which require no continual interaction with the user. There are both static and mobile agents.

Mobile agents are known, by way of example, from U.S. Pat. No. 5,603,031 and from the book Software Agents, Bradshaw Jeffrey, Menlo Park, Calif.: AAAI Press/The MIT Press, 1996. The chapter on mobile agents in this book can be retrieved in a slightly modified version on the Internet at the address http://www.generalmagic.com/technology/tech-whitepaper.html.

Mobile agents are programs which can be active at various stations in a computer network and can change their location in the computer network. Conventionally, programs in a network are loaded from one computer onto another computer while they are not active. By contrast, mobile agents are first activated and automatically change their position in the network while they are active.

This small but fundamental difference with respect to conventional programs has considerable effects on the type of applications on the mobile agents in the network. The agents are created at a particular station in the network, which involves stipulating the functions needing to be performed by the agent, so that the agent, having been transmitted to another station in the network, represents the previous station in the network and performs the appropriate functions. This means that functions can be stipulated at one station in the network which are performed at another station in the network. In principle, this is also possible with conventional systems, with this requiring a permanent exchange of information in the network between the two stations so that the station at which the appropriate control operations are stipulated transmits them to the station at which they are performed.

By contrast, the mobile agents require no such control operations, since their functions are stipulated once in advance and are then performed automatically. This significantly reduces the data throughput in the network, with any desired operations being able to be performed at the stations remote from the task issuer.

However, the agents do not always need to operate fully detached from their initiator, but rather can set up communication channels thereto or also to other stations in the network.

When moving from one station in a network to another station in the network, the mobile agents execute a migration command (e.g. "go"). Such a command requires a destination description containing the name, address or type of the station to which the agent is intended to move, or a combination of these. Different stations do not always need to be arranged at different computers in the network. It is also possible for agents to be active at different stations within one computer.

Mobile agents can also multiply, so that they perform their functions independently of one another at different stations.

Mobile agents are frequently used for collecting predetermined data, some of which are evaluated in situ, so that an already preprocessed result is sent to the original task issuer.

One possible application for such mobile agents arises, by way of example, when a purchaser of a particular object receives a low price guarantee from the vendor. The purchaser can then send out one or more mobile agents which independently obtain corresponding offers from other suppliers, possibly monitor them over a certain period of time and send them to the purchaser, so that he can compare them with the price offered by the vendor.

Other, known mobile agents and agent systems are marketed under the names Aglets, Voyager and Concordia and can generally be obtained over the Internet.

So that the mobile agents on the individual computers in the network can be active, these computers need to have a respective "agent system". An agent system is a collection of service programs which need the respective agents for their tasks. These service programs generally comprise an agent manager connected to other service programs, so that the active mobile agents can fall back on the respective computer resources and can migrate from one agent system in the network to another agent system in the network via network interfaces. Generally, an agent system controller is provided which regulates the execution of the agent system on the respective computer.

These agent systems form the stations in the network at which the agents can become active.

Such agent systems are generally written in a platform-independent computer language, such as JAVA, so that they can run on any computer systems.

The transfer of the agents in the network while they are active creates a new programming paradigm according to which the program code itself is moved to the data needing to be processed instead of data being transported to the processing code or the processing code needing to be loaded in the inactive state onto the respective computer.

Agents are generally relatively small programs which are sent out and exploit the intelligence available in situ. Since mobile agents can also perform their tasks when there is no permanent network connection between the individual computers, they are ideally suited to use on mobile computers, which are generally not permanently connected to a network.

However, the agent systems known to date are too extensive for them to be able to be installed on arbitrary simple mobile computers.

Within the context of the present patent application, the term computer also covers simple process computers equipped merely with a minimal hardware configuration (processor, memory and display). Such simple process computers are integrated on a single chip, for example.

SUMMARY OF THE INVENTION

One possible object of the invention is to provide an agent system which is able to offer the scope of functions of known agent systems and is nevertheless also suitable for small computers, such as small process computers.

Another possible object of the invention is to provide an appropriate computer network and a method for loading an agent system from a host computer onto a client computer in a computer network.

The agent system, which can be installed on computers connected in a computer network, has an agent platform and an agent system controller. The agent platform comprises service programs required by a mobile agent in order to be able to be executed on the respective computer. The agent system controller contains an agent system launcher which can be loaded onto a client computer independently of the rest of the agent system and is used for loading the agent system from a host computer.

The agent system is distinguished in that the agent system launcher is designed such that, before an agent system is loaded from a host computer onto the client computer on which at least the agent system launcher is installed, an identifier describing the hardware and/or software of the client computer is sent to the host computer, and a server system, the agent system update program, installed on the host computer is designed such that it takes the identifier describing the hardware and/or the software of the client computer as a basis for compiling an agent system adjusted to the hardware and/or software of the client computer and loads this agent system onto the client computer.

Within the context of the present invention, a host computer is any computer in the network from which it is possible to load an agent system onto another computer, which is referred to as a client computer. It is thus possible for any computer in the network to be a host computer and a client computer, irrespective of its function otherwise in the network.

The agent system launcher, which sends an identifier identifying the client computer to the host computer, and the agent system which is installed on the host computer and takes this identifier as a basis for compiling an adjusted agent system and makes this adjusted agent system available to the client computer make it possible for even small, in particular mobile, computers, for example comprising a simple process computer or a personal digital assistant, to be incorporated into a computer network and to be provided with the agent system, since this agent system is automatically adjusted to the respective client computer and its power.

Typical criteria for adjustment are, by way of example, the display (e.g. color picture tube, color LCD screen, b/w LCD screen, small alphanumeric LCD display or small numeric only display), the available memory space and the available memory medium (RAM, hard disk or the like) or the system software available on the computer (JAVA and derivatives thereof, Windows, Windows-CE, etc.).

The individual adjustment of the agent systems installed on the respective computer means that high powered computers can have agent systems with a correspondingly high scope of performance installed on them, and lower powered computers can have simplified agent systems installed on them which are specifically tailored to the available software and hardware, including any peripheral units which are available.

Another advantage of the agent system is automatically adjusted to the respective environment or the computer and its installed software, so that nobody need worry about the correct configurations of the agent systems on the various computers in a network, even if it is not yet known from the outset which terminals are present on the network. This means that an environment can automatically develop in a network. The individual computers in the network need merely have agent system launchers installed on them.

In a network in which a full agent system has been installed on a single computer, it is sufficient, in principle, for only the agent system launcher to be installed on other computers onto which such an agent system is intended to be loaded, said agent system launcher then requesting, loading and starting an agent system adjusted to its environment.

Another advantage of the agent system is that the agent system launcher can be provided with an update function which tests whether a host computer is able to request a more recent version of the agent system and, if this is possible, the more up to date version of the agent system is requested, loaded on the client computer and started. Since such updates can generally rarely be performed, it is expedient for a full new agent system to be loaded in each case during an update. With very extensive agent systems which are regularly modified, it can be useful to use the update function to test whether individual parts of the agent system on the host computer are more up to date than those on the client computer, in which case possibly only individual parts of the agent system are then loaded from the host computer onto the client computer.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
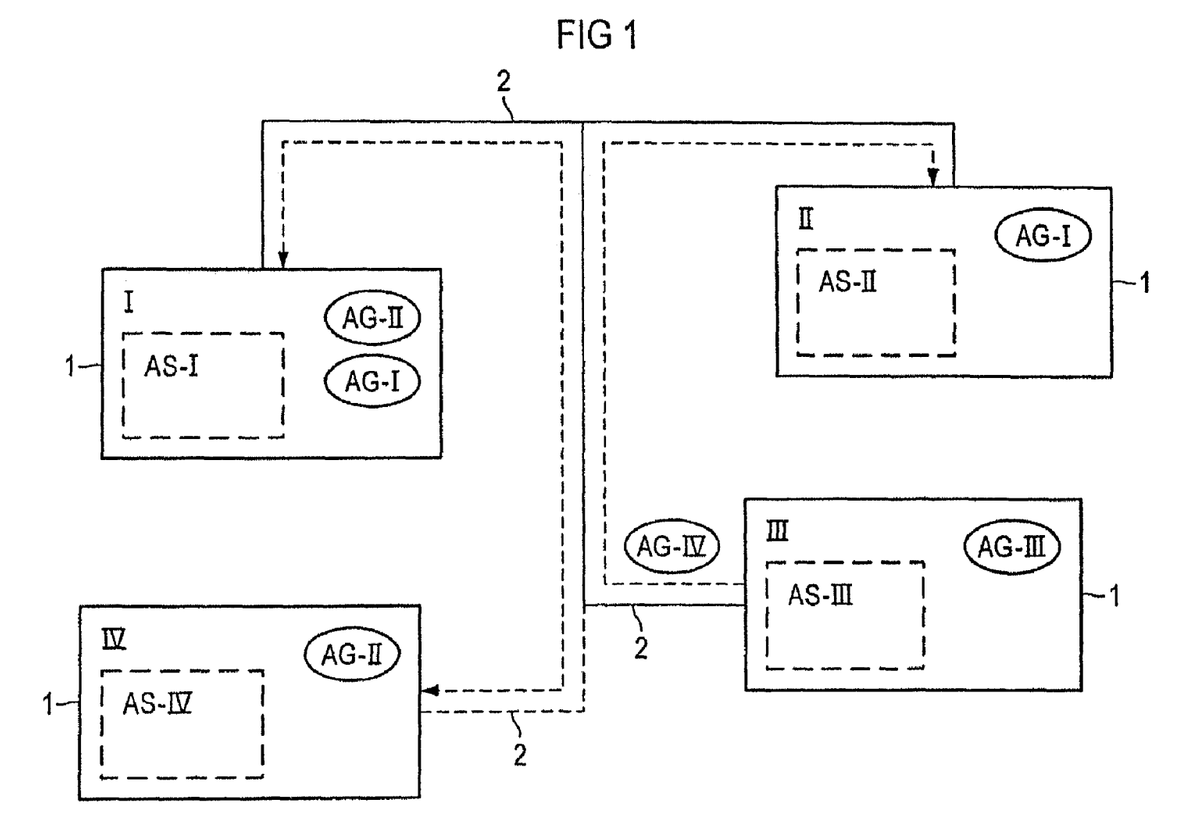
FIG. 1 shows a network by which a plurality of computers are connected together and on which a respective agent system has been installed.

FIG. 1 is a simplified schematic illustration of a network having a plurality of computers 1 which are connected to one another by data lines 2. The computers 1 have different scopes of performance, that is to say that they can have different processor powers, storage capacities and/or system programs. The power of the individual computers 1 is shown symbolically by the size of the rectangle representing the respective computer 1. The computers 1 are numbered from I. to IV., where the computer I. can be the most powerful and the computer IV. is a mobile terminal. The data line 2 from the computer IV. to the other computers is a mobile radio link which is not maintained permanently. It is therefore shown using a dashed line in FIG. 1.

The individual computers 1 have a respective agent system AS-I. to AS-IV. installed on them. The network contains a few mobile agents AG-I. to AG-IV., which are either arranged on one of the computers 1 or move from one computer to another (III.→II.).

Figure 2:
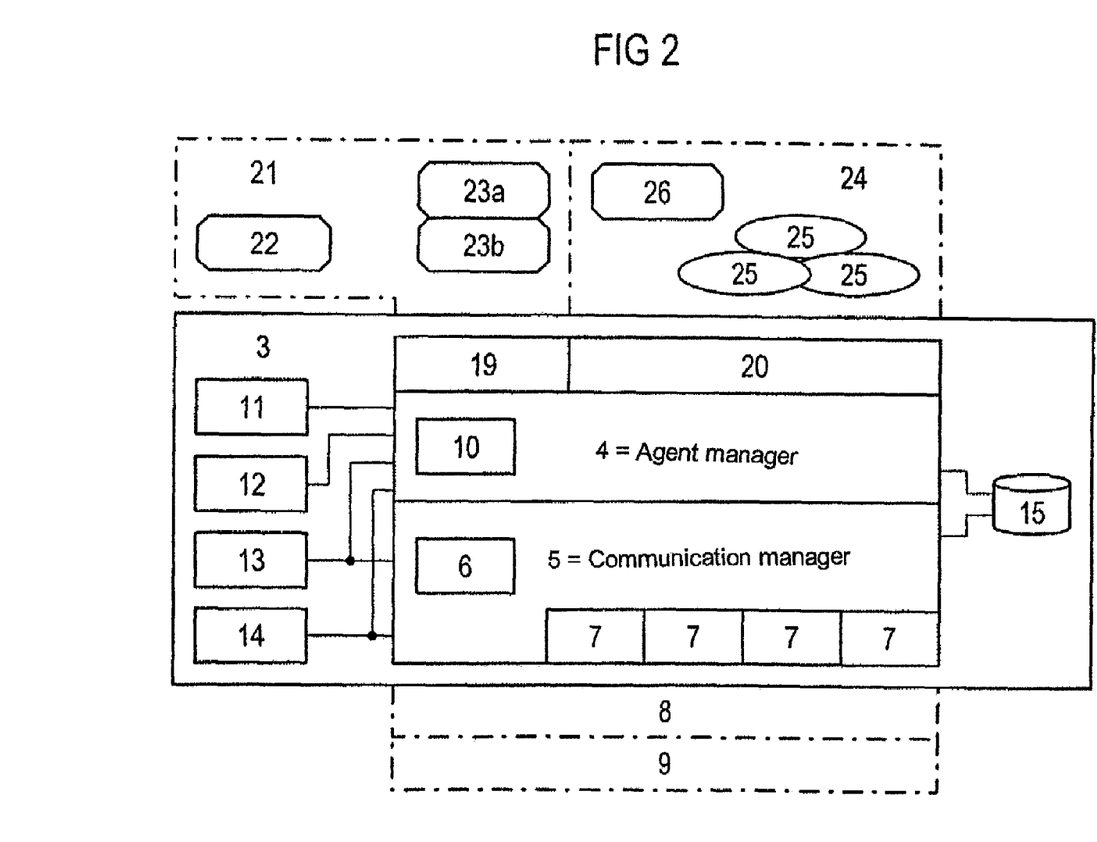
FIG. 2 shows a block diagram of the design of an agent system.

FIG. 2 is a schematic illustration of the design of an agent system. The agent system has an agent platform 3 (also called platform) which comprises the service programs required by a mobile agent in order to be able to be executed on the respective computer 1. The agent platform 3 has two central program parts, the agent manager 4 and the communication manager 5. The communication manager 5 comprises a blackboard 6 and a plurality of protocol managers 7 providing the protocols for communication between agent systems and their applications, the agents 25. In addition, the communication manager allows the agents to migrate. A network coupling 8 is used by the protocol managers 7 to allow the appropriate use of a connected network 9. The blackboard 6 can be used to buffer store data for the platform local communication between agents.

The agent manager 4 has a monitoring module 10 which is used to monitor internal operations for applications 25 connected to the agent manager 4. The monitoring information is processed by service programs, such as an agent software update program 11, a user manager 12, a security manager 13 and a resource manager 14. The agent manager 4 is also connected to a read only memory 15, for example represented by a hard disk. The read only memory 15 is used to store configuration data and important runtime information, such as agents, so that these are available again even after temporarily switching off. In small mobile computers IV, it is also customary for this read only memory 15 to be in the form of a semiconductor memory which can store data permanently, i.e. even after the computer has been switched off.

The agent manager 4 is provided with an administration interface 19 and an agent application interface 20. The administration interface 19 is used to connect the agent manager 4 to an agent system controller 21 which has an administration program 22 and an agent system launcher 23a and also an agent system update program 23b. The agent system launcher 23a is a service program which assists a user when starting and installing an agent system. The agent system update program 23b is a service program which can take particular presets as a basis for compiling an agent system and for sending it over the network 9. The agent system update program 23b is generally part of an existing agent system. However, it can also be installed on a computer independently of an agent system.

The agent application interface 20 is used to connect the agent manager 4 to an area of application 24 containing agents 25 which can execute particular applications. The agents 25 can reach the area of application 24 via the network 9, the communication manager 5 and the agent manager 4. Alternatively, a user of the computer on which the available agent system has been installed can load them into the area of application 24 using an agent launcher 26, and they can be activated in said area of application. The agent launcher 26 is a service program which assists a user in creating and activating agents 25.

The administration program 22 of the agent system controller 21 assists users in configuring and diagnosing the agent system.

The agent system launcher 23a of the agent system controller 21 is used for starting and loading the agent system onto a computer in the network. The operations performed in this context are shown in the flowchart shown in FIG. 3.

Figure 3:
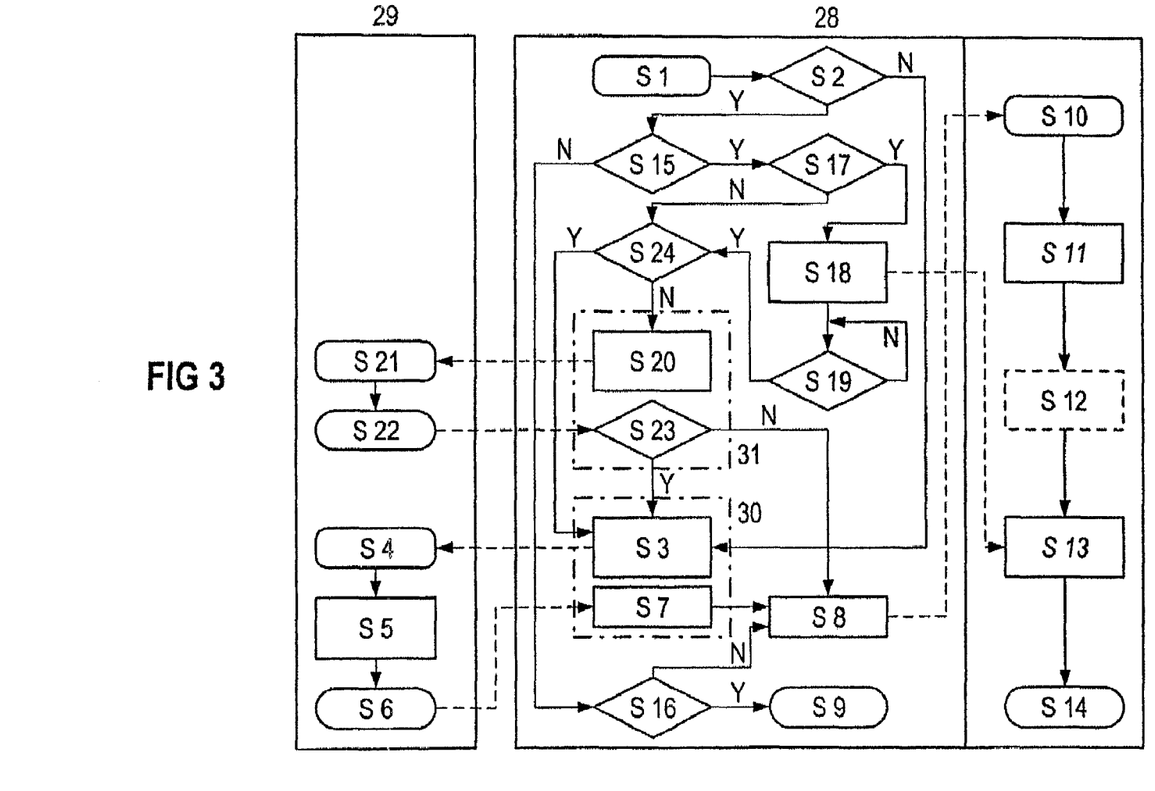
FIG. 3 shows a flowchart for the method for loading an agent system from a host computer onto a client computer in a computer network.

In order for this method for loading an agent system onto a computer to be possible, the computer onto which the agent system is being loaded and which is referred to below as the client computer 28 needs to have the agent system launcher 23a loaded on it. The client computer 28 needs to be connected by a data line 2 to at least one computer on which an agent system update program 23b has been installed, so that this computer, which is referred to below as the host computer 29, makes an adjusted or scaled copy of an agent system which is likewise available on it and can load it onto the client computer 28. The data line 2 can be an electronic or optical cable or a radio link.

The method for loading and updating an agent system is carried out by the agent system launcher 23a and is started in a step S1 (FIG. 3). This is followed by a test to determine whether an agent system AS already exists on the computer (S2). If this test reveals that no agent system exists on the present computer yet, program execution passes to step S3, which is part of a loading function 30 associated with the agent system launcher 23a. In step S3, an identifier identifying the hardware and/or software of the client computer 28 is sent to the host computer 29. This identifier contains statements relating to the power of the hardware and/or the software, such as the size of the available memory, the type of storage medium, the type of display and of the available system programs.

On the host computer, the identifier sent by the client computer 28 is assessed in a step S4, and an agent system is compiled in a step S5 on the basis of the identifier. The agent system is adjusted by adding or omitting components which are suitable/required or not required and configuring and scaling the selected components for the hardware and software available on the client computer 28. In addition, the components are configured in terms of their dynamic complexity, which is essentially based on the size of data structures. Besides the agent manager and the communication manager, the scalable service programs, such as the user manager 12, the security manager 13 and the resource manager 14, are adjusted, that is to say are scaled to the client computer 28. Steps S4 and S5 are performed in the agent system update program 23b arranged in the agent system controller 21 on the host computer 29.

When an agent system adjusted to the client computer 28 has been configured, this adjusted agent system is sent from the host computer 29 to the client computer in step S6. On the client computer 28, the agent system is received and loaded onto the client computer 28 in step S7. Step S7 is part of the loading function 30 of the agent system launcher 23. When the agent system has been loaded from the client computer, it is started in step S8, and the method for loading the agent system is then terminated in the subsequent step S9.

When the agent system is started in step S8, a starting and initialization routine (step S9) is called and is used to start and initialize the agent system. A startup sequence S10 is used to load stored agents (step S11). "Normal" operation of the agent system can then be executed, which is denoted by S12 in FIG. 3. If operation of the agent system needs to be terminated, the agents and runtime information for the agent system are first stored with a shutdown sequence (step S13). The agents are then terminated and the agent system is terminated (step S14).

If, on the other hand, step S2 described above establishes that an agent system already exists on the client computer 28, program execution passes to step S15, which tests whether updating of the agent system is permitted. If updating of the agent system is not permitted, program execution passes to step S16, which tests whether the agent system is in operation. If the agent system is not in operation, it is started in step S8 and the agent system launcher 23a is terminated in step S9. If the agent system is already in operation, program execution passes directly to step S9, where the agent system launcher 23a is terminated.

If the test in step S15 reveals that updating of the agent system is permitted, program execution passes to step S17, which tests whether the agent system is in operation.

If the agent system is in operation, step S18 calls step S13 (shutdown sequence) in order to terminate the operation of the agent system. A subsequent program loop (step S19) is used to test whether operation of the agent system has already ended. Only if the operation of the agent system has ended is program execution transferred to a step S20.

If the test in step S17 reveals that the agent system is not in operation, program execution can pass directly to step S20.

With step S20, a version identifier is sent to the host computer 29. The version identifier contains the information relating to the versions of the agent system, and components thereof, installed on the client computer 28.

On the host computer 29, the version identifiers are evaluated in step S21 and, in the next step S22, version information for the most recent agent system, and components thereof, which can be loaded from the host computer are sent to the client computer. In step S23, the client computer 28 then compares its own version identifiers with the version information and of the host and tests whether the respective version which can be loaded from the host computer is more up to date than the version of the agent system, and components thereof, which is on the client computer. If the test reveals that the version which can be loaded from the host computer 29 is more up to date, program execution is transferred to step S3, whereupon an identifier identifying the hardware and/or software of the client computer 28 is in turn sent to the host computer, and the latter then compiles an agent system adjusted thereto and sends it to the client computer 28. If, on the other hand, the test in step S23 reveals that the versions which can be loaded from the host computer are not more up to date than the versions of the agent system, and components thereof, which are on the client computer, program execution is transferred to step S8, where the agent system is started. Hence, it is possible to update (during operation) the entire agent system or, if required, merely parts thereof.

Steps S20 and S23 form an update function 31 which the agent system launcher 23a uses to update an existing agent system.

The method for loading an agent system is carried out by the agent system launcher 23a. The agent system launcher can be started manually at any time, irrespective of whether or not an agent system is available or whether or not the agent system is in operation. The agent system launcher 23a can also be activated automatically when it is first loaded onto a computer or when a computer is started. If a full agent system already exists, then the agent system launcher 23a can be controlled directly by the user or by the administration program 22, with the administration program 22 being able to call it repeatedly, thus ensuring that the agent system is updated regularly and according to requirements.

To manage the agent systems on a plurality of mobile client computers 28, a host computer 29 permanently connected to a network can be provided. If, by way of example, a small mobile computer, the client computer 28, having a black and white screen is to start an agent system, then the host computer 29 sends a request to the client computer 28 and in so doing also transfers the current data relating to its resources (e.g. b/w screen, 8 MB RAM, maximum number of windows which can be shown on the screen, Java Virtual Machine available, graphical display of characters, user management functionality in the agent system for one or more users, etc.). The host computer 29 uses this information to compile an agent system which contains, by way of example, a Java class for printing specifically on b/w appliances. The equivalent class for printing on appliances with a color screen or a screen which can show only ASCII characters would have a different appearance. Depending on a Java Virtual Machine (Persona Java, JDK1.x, 1.2, etc.) available on the client computer 28, the appropriate classes are compiled automatically. If only one user needs to be managed, as compared with a plurality, the appropriate class providing the user management is also correspondingly smaller and has a smaller resource requirement on the client computer 28.

The agent system can optionally be provided with a function which automatically tests the hardware and/or software of the respective computer and starts the launcher 23a if required. This means that the agent system can be adjusted dynamically to changes in the hardware and/or in the software. This function can be provided by step S24 in FIG. 3, which follows step S17. Step S24 tests whether the hardware and/or software has been changed since the agent system was last updated. If such a change is established, program execution passes directly to step S3, where an appropriate identifier is sent to the host computer 29. If such a change is not established, the program passes to step S20 and is executed in line with the description above. The programs on which the agent systems are based can be stored and sold on electronically readable data stores.

The invention has been described in detail with particular reference to preferred embodiments thereof and examples, but it will be understood that variations and modifications can be effected within the spirit and scope of the invention.

What is claimed is:

1. An agent system which can be installed on computers connected in a computer network, comprising:
    an agent platform which comprises service programs required in order for the agent system to be executed on the respective computers,
    an agent system launcher to be loaded onto a client computer independently of a reminder of the agent system and is used for loading the agent system from a host computer, such that, before the agent system is loaded from the host computer onto the client computer, the agent system launcher sends an identifier identifying at least one of client computer hardware and client computer software, the identifier being sent to the host computer, and
    an agent system update program to be installed on the host computer to selectively add components to the agent system based on the identifier and at least one of client computer hardware and client computer software, and then to transmit the agent system to the client computer.

2. The agent system as claimed in claim 1,
    wherein the agent system launcher is designed both for loading a full agent system and for loading parts of the agent system.

3. The agent system as claimed in claim 2,
    wherein the agent system launcher tests at least one of hardware and software of the client computer in order to produce the identifier.

4. The agent system as claimed in claim 3,
wherein the agent system launcher compares a version of a previous agent system installed on the client computer with a version of the agent system which can be loaded from the host computer.

5. The agent system as claimed in claim 4, wherein the agent system is an agent system for mobile agents.

6. The agent system as claimed in claim 1,
wherein the agent system launcher tests at least one of hardware and software of the client computer in order to produce the identifier.

7. The agent system as claimed in claim 1,
wherein the agent system launcher compares a version of a previous agent system installed on the client computer with a version of the agent system which can be loaded from the host computer.

8. The agent system as claimed in claim 1, wherein the agent system is an agent system for mobile agents.

9. A computer network having a plurality of computers, comprising:
a host computer;
a client computer;
data lines connecting the host and client computers; and
an agent system comprising:
   an agent system launcher loaded onto the client computer to send to the host computer an identifier identifying at least one of client computer hardware and client computer software and to subsequently load the agent system onto the client computer, and
   an agent system update program installed on the host computer to assemble the agent system by selectively adding components, based on the identifier and at least one of client computer hardware and client computer software, and then to transmit the agent system to the client computer.

10. The computer network as claimed in claim 9,
wherein at least one of the computers is a mobile computer.

11. The computer network as claimed in claim 10,
wherein the mobile computer is connected to the computer network by a nonpermanent data line.

12. The agent system as claimed in claim 9,
wherein the agent system launcher is designed both for loading a full agent system and for loading parts of the agent system.

13. The agent system as claimed in claim 9,
wherein the agent system launcher tests at least one of hardware and software of the client computer in order to produce the identifier.

14. The agent system as claimed in claim 9,
wherein the agent system launcher compares a version of a previous agent system installed on the client computer with a version of the agent system which can be loaded from the host computer.

15. The agent system as claimed in claim 9, wherein the agent system is an agent system for mobile agents.

16. A method for loading a system from a host computer to a client computer, comprising:
agent system launcher sending an identifier identifying at least one of hardware and software of the client computer, the identifier being sent from an agent system launcher loaded on the client computer, the identifier being sent to the host computer;
compiling an agent system adjusted to at least one of hardware and software of the client computer based on the identifier received at the host computer from the client computer, the agent system being compiled by an agent system update program on the host computer by selectively adding components;
transmitting the agent system to the client computer; and
loading the agent system on the client computer by the agent system launcher.

17. The method as claimed in claim 16, wherein
the agent system launcher first checks whether a previous agent system is already installed on the client computer,
if the previous agent system is installed, the agent system launcher tests whether an update is possible or required and whether the previous agent system is in operation, and
if an update is possible or required and the previous agent system is in operation, the operation of the agent system is terminated so that it can be updated.

18. The method as claimed in claim 17, wherein a call to the host computer involves the client computer sending the identifier to the host computer and then receiving the agent system from the host computer.

19. The method as claimed in claim 16, wherein a call to the host computer involves the client computer sending the identifier to the host computer and then receiving the agent system from the host computer.

20. The method as claimed in claim 19, further comprising:
if a previous agent system is loaded on the client computer, determining whether the previous agent system should be updated; and
updating the previous agent system.

21. The method as claimed in claim 20, further comprising:
testing whether an update is possible in principle;
if an update is possible, sending a version identifier to the host computer;
sending to the client computer version information indicating a most recent agent system which can be loaded from the host computer;
comparing the version identifier with the version information, and
if the comparison reveals that the version which can be loaded from the host computer is more up to date than the version of the previous agent system which is on the client computer, updating the previous agent system.

22. The method as claimed in claim 21,
wherein comparing the version identifier with the version information involves testing whether separable parts of the agent system on the host computer are more up to date than corresponding separable parts of the previous agent system on the client computer, and
if separable parts on the host computer are more up to date, then only the separable parts of the previous agent system are updated.

23. The method as claimed in claim 22,
wherein the identifier comprises information on the client computer selected from the group consisting of memory size, type of display, typical processing speed, type of network and system software used.

24. The method as claimed in claim 16,
wherein the identifier comprises information on the client computer selected from the group consisting of memory size, type of display, typical processing speed, type of network and system software used.

25. A method for loading a system from a host computer to a client computer, comprising:
sending an identifier from the client computer to the host computer, the identifier identifying at least one of client computer hardware and client computer software;

assembling an agent system based on at least one of client computer hardware and client computer software based on the identifier, the agent system being assembled at the host computer by selectively adding components;

transmitting the agent system to the client computer; and
loading the agent system on the client computer.

* * * * *

UNITED STATES PATENT AND TRADEMARK OFFICE
CERTIFICATE OF CORRECTION

PATENT NO. : 6,981,251 B1
APPLICATION NO. : 10/049864
DATED : December 27, 2005
INVENTOR(S) : Birgit Kreller et al.

Page 1 of 1

It is certified that error appears in the above-identified patent and that said Letters Patent is hereby corrected as shown below:

Title Page
In the Inventors (75) change "Bjoern Schiemann" to --Birgit Schiemann--

Signed and Sealed this

Fourth Day of July, 2006

JON W. DUDAS
*Director of the United States Patent and Trademark Office*